Aug. 2, 1960
F. D. NICHOLS
2,947,425
HYDRAULIC HOIST
Filed Aug. 22, 1958
2 Sheets-Sheet 1
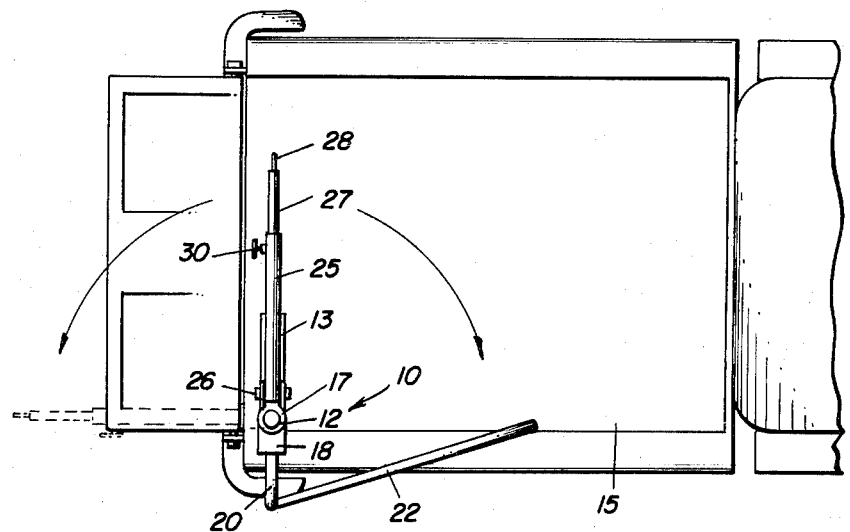
Fig.1
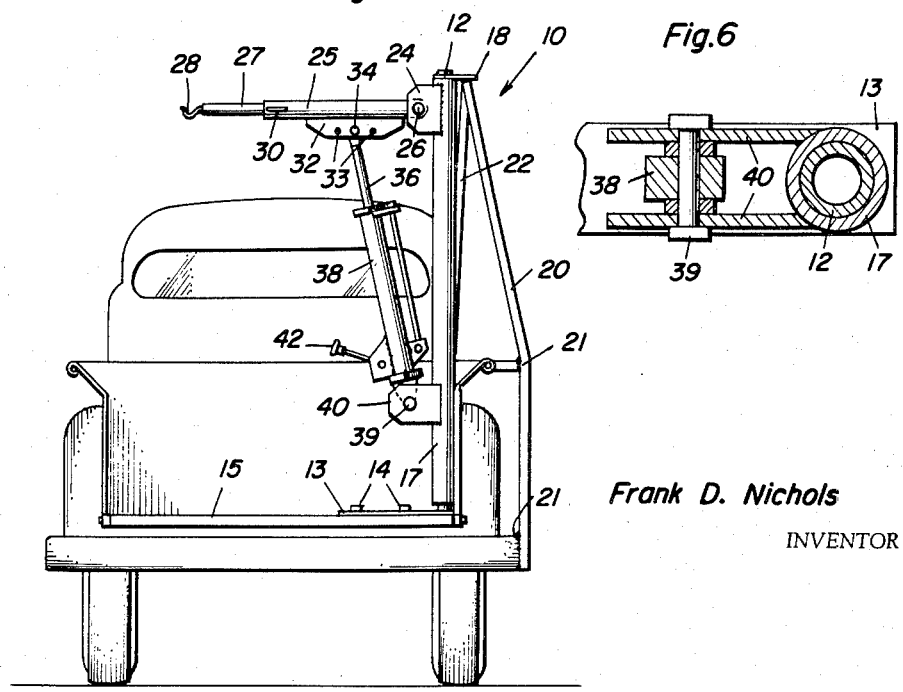
Fig.2
Fig.6
Frank D. Nichols
INVENTOR

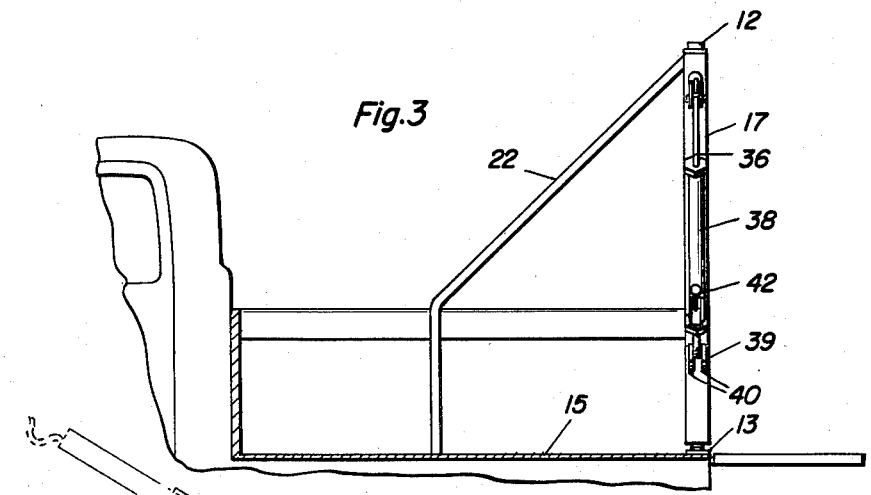
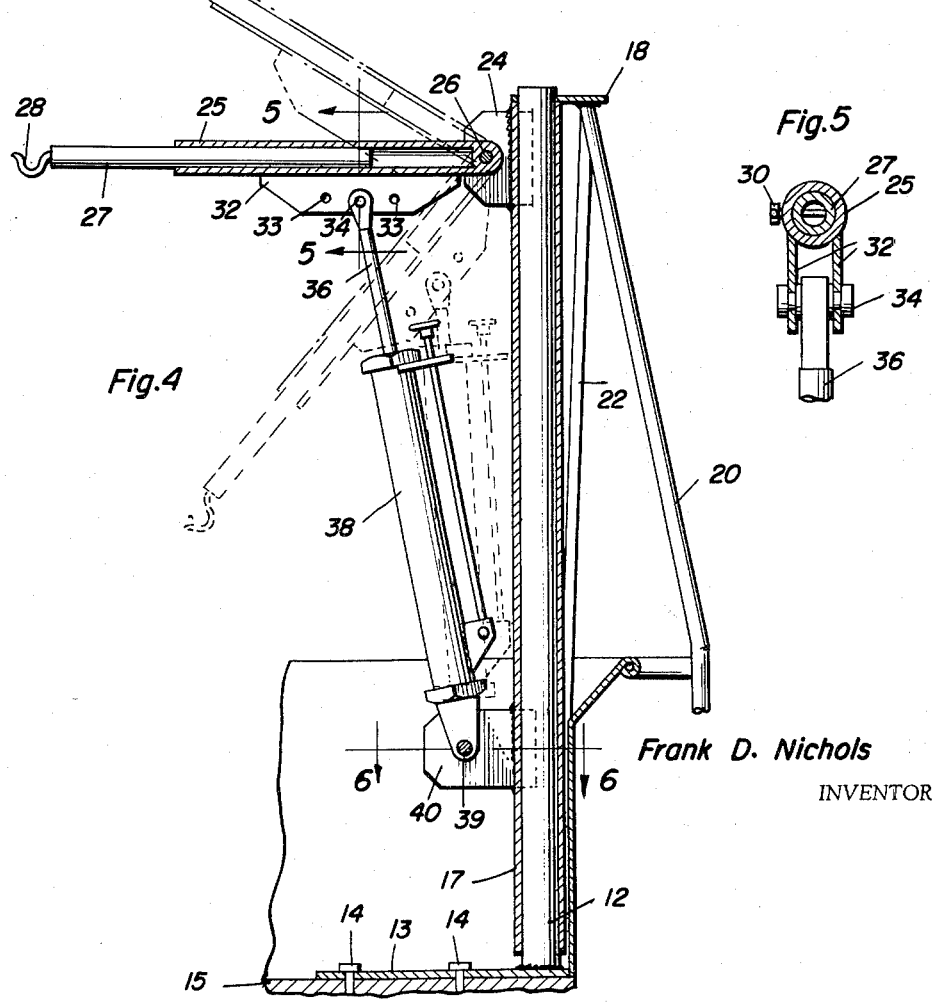
Frank D. Nichols
INVENTOR

United States Patent Office 2,947,425
Patented Aug. 2, 1960

2,947,425

HYDRAULIC HOIST

Frank D. Nichols, 18 E. 41st St., San Angelo, Tex.

Filed Aug. 22, 1958, Ser. No. 756,714

1 Claim. (Cl. 212—35)

This invention relates to mechanical lifts and more particularly to a hydraulic hoist assembly.

It is an object of the present invention to provide a hydraulic hoist of particularly light weight construction that is so mounted and arranged as to facilitate the lifting of extremely heavy loads and for moving such loads within a limited radius from one position to another.

Another object of the present invention is to provide a hydraulic hoist that can be readily mounted upon a vehicle, such as a pick up truck for performing various tasks in different locations, and which is constantly available for use without wasting the load space of the vehicle.

Still another object of the present invention is to provide a hoist of the above type that has self contained manual operating means for effecting operation thereof, and which does not require an external power source for such operation.

Other objects of the invention are to provide a hydraulic hoist bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which:

Figure 1 is a fragmentary top plan view of a vehicle embodying a hydraulic hoist made in accordance with the present invention;

Figure 2 is a rear elevational view of the assembly shown in Figure 1;

Figure 3 is a fragmentary side elevational view, with parts broken away, of the apparatus shown in Figure 2;

Figure 4 is an enlarged rear elevational view, with parts broken away, of the apparatus shown in Figure 2;

Figure 5 is a transverse cross sectional view taken along line 5—5 of Figure 4; and Figure 6 is a fragmentary cross sectional view taken along line 6—6 of Figure 4.

Referring now more in detail to the drawing, a hydraulic hoist 10 made in accordance with the present invention is shown to include an upright support post 12 of substantially circular cross section that is secured to a mounting plate 13 at its lower end. This mounting plate 13 can be secured to the body 15 of the vehicle, such as by bolts 14, preferably adjacent to the rear end thereof.

A mounting member 17 in the form of a tubular sleeve receives and is rotatably supported upon the upright post 12. A plate 18 is secured to the upper end of the post 12, free from the mounting sleeve 17, for integral connection to the upper extremities of a side post 20 and a forwardly and downwardly extending post 22. These posts, intermediate their lengths, can be further secured to the vehicle body, such as by welds 21, so as to increase the rigidity of the upright post 12 and its supported tubular mounting member 17.

A pair of spaced apart parallel plates 24 secured to the upper end of the sleeve 17 rotatably support one end of a hollow sleeve 25 forming a part of a lift arm assembly, by means of a pin 26. An extension rod 27 is slidably supported within the main hollow sleeve 25 and has a load support hook 28 at its outer free end. A wing bolt 30 acts as a set screw to secure the extension rod 27 in any desired adjusted position relative to the main tubular member 25. A pair of spaced apart parallel webs 32 depend from the lower side of the main sleeve 25 to form a mounting for the outer free end of a plunger 36 that is telescopically and slidably supported within a hydraulic cylinder 38. These webs 32 are provided with a plurality of spaced apart openings 33 through which the pin 34 associated with the plunger 36 extends so as to enable the operator to adjust the swing of the lift arm assembly in the vertical plane, between the limits allowed by the length of the plunger rod 36 and the hydraulic cylinder 38. The lower end of the cylinder 38 is connected, by means of a pivot pin 39 to another pair of mounting plates 40 carried by the lower portion of the mounting member 17.

In actual use, the entire lift consisting of the mounting member 17 and attached lifting arm and hydraulic cylinder assembly is rotatable about the vertical longitudinal axis of the upright post 22 between an overboard position and an inboard position relative to the vehicle body. This swing is illustrated in broken lines in Figure 1 of the drawing. The vertical lifting action of the lift arm is controlled by the hydraulic cylinder 38 which cylinder can be actuated by means of a manually operated pump controlled by a handle 42. Reciprocating movement of the handle 42 is operative to pressurize the cylinder 38 to effect vertical movement of the work supporting hook 28, between the limits illustrated in broken lines in Figure 4. Thus, with the combined vertical movement of the lift arm and the rotative movement of the support member, it is possible to load and unload the vehicle in a simple and efficient manner. If desired, a motor driven pump can be used to supply the necessary fluid pressure for operation of the device, if such is desired.

While various changes may be made in the detail construction, it shall be understood that such changes shall be within the spirit and scope of the present invention as defined by the appended claim.

What I claim as new and desire to protect by Letters Patent of the United States is:

A fluid operated hoist for pickup trucks with a body having a floor, a side extending upwardly and flared outwardly at the top and a transverse bar member under the bottom and extending laterally outwardly from thereunder to lie beneath the flanged upper end of the side, a base mounting plate, means for securing said base mounting plate adjacent the side wall and to the bottom of the body, an upright support post fixed at its lower end to the mounting plate, a plate fixed to the upper end of the support plate, and extending in a direction outwardly over the flanged upper end of the vehicle body, a side post secured to the upper plate and extending downwardly and outwardly of the side wall and anchored thereto and fixed at its lower end to the extended outer end of the transverse bar, an upright post secured at its upper end to said upper plate and extending forwardly and downwardly and secured to the inner side of the side wall, whereby said vertical upright support anchored in the bottom plate is held against lateral, fore and aft displacement, a tubular sleeve disposed on the upright support for turning movement, vertically spaced pairs of vertically extending spaced apart parallel plates, an extensible arm structure pivoted to the upper pair of spaced apart plates, a fluid cylinder pivotally connected to the lower pair of spaced apart plates, and means for adjustably securing the upper end of the fluid cylinder device to the arm structure whereby said arm structure can be elevated to adjustable different distances and the arm structure and fluid cylinder device may be swung horizontally by the sleeve upon support posts, and fluid pressure supply means for said fluid cylinder device.

References Cited in the file of this patent

UNITED STATES PATENTS

| | | |
|---|---|---|
| 873,076 | Olsen | Dec. 10, 1907 |
| 2,374,045 | Soucia | Apr. 17, 1945 |
| 2,517,813 | Wallace | Aug. 8, 1950 |
| 2,684,109 | Youmans | July 20, 1954 |